United States Patent Office 3,234,212
Patented Feb. 8, 1966

3,234,212
PROCESS FOR PRODUCING EPSILON-HYDROXY CAPROIC ACID AND CAPROLACTAM
Charles N. Winnick, Teaneck, and Stanley Rudoff, Elizabeth, N.J., assignors to Halcon International, Inc.
No Drawing. Filed Mar. 28, 1962, Ser. No. 183,031
19 Claims. (Cl. 260—239.3)

This invention relates to the preparation of caprolactam from cyclohexanol via a substance containing the hydroxy-caproyl moiety, more particularly to the oxidation of a concentrated cyclohexanol to a peroxidic derivative thereof followed by rearrangement of the latter in the presence of an acidic material to form a substance containing the hydroxy-caproyl moiety, and reaction of the latter substance with ammonia to form caprolactam; and the invention relates especially to such a process wherein the mixture is rearranged with hydrogen fluoride to convert peroxidic substance therein to substance containing the hydoxy-caproyl moiety and then reacting with aqueous ammonia to form caprolactam.

Caprolactam is a substance of great utility and enormous commercial significance, since it forms the starting point for the manufacture of the very important plastic known commercially as "nylon-6." Epsilon-hydroxy-caproic acid is a useful starting material both for the preparation of caprolactam and because it can be converted to interesting polyester resins. In general, however, known processes for the preparation of either of these materials leave much to be desired from the economic viewpoint, and the art is confronted with the problem of providing more efficient process for the production thereof.

The discoveries associated with the invention and relating to the solution of the above problems, and the objects achieved in accordance with the invention as set forth herein include the provision of:

A process for the preparation of an epsilon-hydroxy-caproic acid derivative from cyclohexanol which comprises treating the latter with molecular oxygen (preferably in the absence of mineral acid and in the presence of a catalytic amount of peroxide initiator), to convert 5–25% (mol) of the original cyclohexanol to an oxidate containing 0.04 to 0.18 mol of peroxidic oxygen per 100 gms., treating the peroxidic product so produced with a mineral acid at a temperature in the range of 0 to 70° C. to form a material containing an epsilon-oxycaproyl moiety, and recovering said material;

Such a process in which the hydroxycaproic acid derivative is treated with ammonia in the presence of water at a temperature in the range of 225–325° C. and a partial pressure of ammonia in the range of 100 to 2000 p.s.i.g. whereby epsilon-caprolactam is formed, and recovering said lactam;

Such a process in which the water is mixed with a hydroxylic organic solvent (and optionally with a hydrogenation catalyst);

Such a process in which the hydroxycaproic acid derivative is treated with ammonia in the presence of water at a temperature in the range of 100° to 225° C. and a partial pressure of ammonia in the range of 100 to 2000 p.s.i.g. whereby epsilon-hydroxycaproamide is formed, separating cyclohexanol and treating said amide with ammonia at a temperature in the range of 225 to 325° C. in water at a partial pressure of ammonia in the range of 100 to 2000 p.s.i.g. whereby epsilon caprolactam is formed, and recovering said lactam;

Such a process in which the water is mixed with hydroxylic organic solvent;

Such a process wherein substantially 100% cyclohexanol is used and the mineral acid is hydrogen fluoride;

Such a process wherein 1 to 20% of water based on oxidate is added to the oxidate before adding the hydrogen fluoride;

Such a process wherein substantially 100% cyclohexanol is used and the mineral acid is sulfuric acid;

Such a process wherein substantially 100% cyclohexanol is used and the mineral acid is phosphoric acid;

Such a process wherein substantially 100% cyclohexanol is used and the mineral acid is p-toluenesulfonic acid;

Such a process wherein the starting cyclohexanol is the product obtained by oxidizing cyclohexane with molecular oxygen in the presence of meta-boric acid followed by separation of the oxygenated cyclohexane material;

And other objects which will be apparent as details or embodiments of the invention are set forth hereinafter.

In order to indicate still more fully the nature of the present invention, the following examples of typical procedures are set forth in which parts and percents means parts and percents by weights, respectively, unless otherwise indicated, it being understood that these examples are presented as illustrative only and they are not intended to limit the scope of the invention.

*Example 1*

A mixture of 7000 gms. of cyclohexanol substantially 100% pure, 7 gms. of commercial cyclohexanone peroxide and 7 gms. of powdered calcium carbonate is vigorously stirred in a 2-liter creased flask. Oxygen is bubbled through the mixture at a rate of 0.7 l./min. (measured at room temperature and atmospheric pressure) while the temperature is rapidly raised to 120° C. After 8 liters of oxygen have been absorbed, the flask is cooled to 110° C. and the oxidation is continued until a total of 17 liters of oxygen have been absorbed. Iodometric titration of the cooled oxidate indicates the presence of 0.57 mol of peroxidic oxygen representing an 80% efficiency to peroxide, from the absorbed oxygen. Alkaline titration indicates the presence of 0.02 equivalent of free organic acids.

The above oxidation can be initiated in the presence of 0.05–0.06 mol of peroxidic oxygen from a previous oxidate, instead of cyclohexanone peroxide.

The combined oxidate of several such runs is rearranged to esters by treatment with anhydrous hydrogen fluoride. A 1025 gm. sample of cyclohexanol oxidate containing 0.79 mol of peroxidic oxygen is introduced into an evacuated 2 liter Monel metal cylinder. The sample is cooled in Dry Ice-acetone and 205 gm. (20 wt. percent) of anhydrous hydrogen fluoride is intorduced into the cylinder. The mixture is brought to room temperature, shaken to insure solubilization of hydrogen fluoride in the cyclohexanol, and discharged into a 1-gallon polyethylene container. The homogeneous mixture is allowed to stand at room temperature for 2 hours, at which time the rearrangement of peroxide to ester is complete.

The hydrogen fluoride is removed from the product by distillation under vacuum in an all Monel metal still, leaving behind an ester residue dissolved in cyclohexanol. Residual traces of hydrogen fluoride are removed by a potassium carbonate wash to a pH of 2 to 3. Final stripping of cyclohexanol leaves an ester residue of 135 gms. containing 0.66 equivalent of ester.

Fifteen grams of the crude ester is added to a mixture of 50 ml. of 28% aqueous ammonia and 50 ml. of isopropanol in a 300 ml. autoclave. An additional 21 gm. of anhydrous ammonia is pressured into the autoclave. The system is heated at 225° C. for 20 hours, and the system pressure is 600 to 640 p.s.i.g. The solution is then distilled to remove solvent and cyclohexanol. The residual crude hydroxycaproamide is dissolved in 100 ml. of 28% aqueous ammonia and heated in a autoclave for 18 hours under elevated pressure, as above. After removal of solvent, 5.7 gms. of caprolactam is recovered.

The yield of caprolactam based on cyclohexanol converted is 54% and the yield of cyclohexanone is 15%. Since cyclohexanone is easily reconverted to the alcohol by hydrogenation, by taking credit therefor, the net overall yield is 64%.

*Example 2*

The procedure of Example 1 is repeated except that cyclohexane is used as a starting material and it is oxidized with molecular oxygen in the presence of metaboric acid to give an oxidation reaction mixture containing a relatively high proportion of cyclohexanol, after removing the cyclohexane and the boric acid material therefrom. This mixture is subject to the oxidation, and very good yields of the caprolactam are obtained based on the cyclohexanol contained in the material subjected to the peroxide oxidation step.

Comparable results to the foregoing may be obtained with various modifications, including the following:

It is generally preferable to oxidize only 10-20% of cyclohexanol per pass in order to obtain high efficiencies. The oxidation is initiated with a peroxide, desirably peroxide from a previous cyclohexanol oxidation. The oxidation is accomplished by passing molecular oxygen, pure or diluted with an inert gas such as nitrogen, through the cyclohexanol with good agitation of temperatures between 75° and 140° C. and at pressures from atmospheric to 1000 p.s.i.g. The oxidate consisting of a solution in cyclohexanol of the peroxides, along with the minor amounts of acids, esters and cyclohexanone is rearranged by treatment with an acid, desirably hydrogen fluoride, at 5-50° C. for 10 minutes to 24 hours. The concentration of acid may vary from 1-90%. The oxidate may contain 0.04 to 0.18 mol of peroxide oxygen per 100 gms. of oxidate.

It is an important feature of this invention which contributes greatly to its utility and economy, that rearrangement of the initial peroxidic material can be carried out in the solvent in which it is formed. By avoiding the isolation of sensitive peroxides both operating expense and yield loss are eliminated.

Anhydrous hydrogen fluoride is a preferred acidic catalyst for bringing about the rearrangement, since its use provides somewhat enhanced yields of final product. It is also preferred because of the relative ease with which it can be removed and recovered from the rearrangement mixture. However, as is well known, the requirements for handling hydrogen fluoride may, under some circumstances, make it appear less desirable. In such cases, other acidic materials may be used, such for example as sulfuric acid, phosphoric acid or p-toluene sulfonic acid, with good results.

The rearranged material contains a high concentration of substances containing the oxycaproyl moiety

(—O—CH$_2$—CH$_2$—CH$_2$—CH$_2$—CH$_2$—CO—)

ether as epsilon-hydroxycaproic acid, single esters of that acid, or low molecular weight condensation polymers of the acid, or a combination thereof.

The hydroxycaproic acid derivatives may be treated in a variety of ways. They may be treated with aqueous ammonia at 225° to 325° C. and superatmospheric pressure (500 to 2500 p.s.i.g. ammonia partial pressure) to yield caprolactam. They may be saponified with alkali and the free acid recovered by conventional techniques, and the free acid converted to caprolactone by treatment with a mineral acid.

In a preferred modification the hydroxycaproic acid derivatives are converted to hydroxycaproamide by treatment with ammonia. This can be accomplished at temperatures of 150° to 300° C. and pressures of 100 to 3000 p.s.i.g. Desirably the reaction is carried out in a solvent, e.g., water, methanol or cyclohexanol and it is especially desirable to use a mixture of one of these hydroxylic organic solvents with water. In practice the unrefined hydroxycaproic acid derivatives in cyclohexanol solution are aminated directly, and the amide is recovered by removal of solvent by distillation, preferably under vacuum.

At the same time cyclohexanol which had been esterified is liberated and can be recycled.

The hydroxyamide may be converted to caprolactam by heating in water to temperatures over 200° C. alternatively aqueous ammonia may be employed. Catalysts such as nickel, platinum, palladium, and the like may be employed to promote conversion of the amide to lactam in aqueous system.

The hydroxyamide may be converted to caprolactam by heating with anhydrous ammonia at temperatures over 200° C. Furthermore the conversion of hydroxycaproamide to lactam may be accomplished in the vapor phase at temperatures over 200° C. with catalysts such as alumina, silica-alumina, supported platinum, supported nickel and the like.

In other runs like Example 1, a 94% efficiency is obtain (0.67 mol peroxidic oxygen), titrating 0.05 equivalent of free organic acids. In converting the amide to the lactam, a 300 ml. autoclave may be used, with autogenous pressure for 18 hours. A preferred oxidation temperature is in the range of 100° to 120° C. The rearrangement reaction proceeds at about —40° C. up to +70° C. The rearrangement may be with hydrochloric acid, an organic sulfonic acid, or an acidic ion exchange resin such as a sulfonated polyester or the like or one having a macro-reticular structure. Lactones and corresponding polyesters may be formed thereby.

In view of the foregoing disclosures, variations and modifications thereof will be apparent to one skilled in the art, and it is intended to include within the invention all such variations and modifications except as do not come within the scope of the appended claims.

What is claimed is:

1. A process for the preparation of an epsilon-hydroxycaproic acid derivative from cyclohexanol which comprises treating the latter with molecular oxygen to convert 4 to 25% of the original cyclohexanol to an oxidate containing 0.04 to 0.18 mol of peroxidic oxygen per 100 gms., treating the peroxidic product so produced with a mineral acid at a reaction temperature up to 70° C. to form a material containing epsilon-oxycaproyl moiety, and recovering said material.

2. A process of claim 1 in which the initial oxidation is effected in a solution free of mineral acids.

3. A process of claim 1 in which the hydroxycaproic acid derivative is treated with ammonia in the presence of water at a temperature in the range of 225 to 325° C. and a partial pressure of ammonia in the range of 100 to 2000 p.s.i.g. whereby epsilon-caprolactam is formed, and recovering said lactam.

4. A process of claim 3 in which the water is mixed with a hydroxylic organic solvent.

5. A process of claim 1 wherein the hydroxycaproic acid derivative is treated in water with at least 1 mol of ammonia per mol of hydroxycaproic acid derivative at a temperature in the range of 200° to 325° C. whereby epsilon-caprolactam is formed and recovering said lactam.

6. A process of claim 5 in which a hydrogenation catalyst is present in the aqueous mixtures.

7. A process of claim 1 where the hydroxycaproic acid derivative is treated with amonia so as to form caprolactam, and recovering the latter.

8. A process of claim 1 in which the hydroxycaproic acid derivative is treated with at least one mol of ammonia per mol of the derivative in the presence of water at a temperature in the range of 100° to 225° C. and a partial pressure of ammonia in the range of 100 to 2000 p.s.i.g. whereby epsilon-hydroxycaproamide is formed, separating cyclohexanol and treating said amide with ammonia at a temperature in the range of 225° to 325° C. in water at a partial pressure of ammonia in the range of 100 to 2000 p.s.i.g. whereby epsilon-caprolactam is formed, and recovering said lactam.

9. A process of claim 8 in which the water is mixed with hydroxylic organic solvent.

10. A process of claim 1 wherein substantially 100% cyclohexanol is used and the mineral acid is hydrogen fluoride.

11. A process of claim 10 wherein 1 to 20% of water based on oxidate is added to the oxidate before adding the hydrogen fluoride.

12. A process of claim 1 wherein substantially 100% cyclohexanol is used and the mineral acid is sulfuric acid.

13. A process of claim 1 wherein substantially 100% cyclohexanol is used and the mineral acid is phosphoric acid.

14. A process of claim 1 wherein substantially 100% cyclohexanol is used and the mineral acid is p-toluenesulfonic acid.

15. A process of claim 1 wherein substantially 100% cyclohexanol is used with hydrochloric acid.

16. A process of claim 1 wherein substantially 100% cyclohexanol is used with an organic sulfonic acid.

17. A process of claim 1 wherein substantially 100% cyclohexanol is used with an acidic ion exchange resin.

18. A process of claim 1 wherein the starting cyclohexanol is the product obtained by the oxidizing cyclohexane with molecular oxygen in the presence of a boron derivative providing material, followed by separation of the oxygenated cyclohexane material, said material being selected from the group consisting of boron oxide, orthoboric acid, metaboric acid and esters of said acids.

19. A process of claim 18 wherein the material is metaboric acid.

References Cited by the Examiner
UNITED STATES PATENTS

| 2,840,553 | 6/1958 | Pieper | 260—239.3 |
| 2,840,554 | 6/1958 | Pieper | 260—239.3 |

OTHER REFERENCES

Brown et al.: J.A.C.S., volume 71, pages 1756–9 (1955).

Minisci: "Gazz, Chim. Ital.," volume 89, pages 639–37 (1959).

WALTER A. MODANCE, *Primary Examiner.*

IRVING MARCUS, *Examiner.*

UNITED STATES PATENT OFFICE
CERTIFICATE OF CORRECTION

Patent No. 3,234,212                                        February 8, 19

Charles N. Winnick et al.

It is hereby certified that error appears in the above numbered patent requiring correction and that the said Letters Patent should read as corrected below.

Column 3, line 34, for "peroxide" read -- peroxidic --
line 57, for "ether" read -- either --.

Signed and sealed this 10th day of January 1967.

(SEAL)
Attest:

ERNEST W. SWIDER                                  EDWARD J. BRENN
Attesting Officer                                     Commissioner of Paten